United States Patent [19]

Stone

[11] 4,251,135
[45] Feb. 17, 1981

[54] SOLAR REFLECTOR

[76] Inventor: Douglas C. Stone, 849 Sunrise, Derby, Kans. 67037

[21] Appl. No.: 36,309

[22] Filed: May 7, 1979

[51] Int. Cl.³ .............................................. G02B 5/08
[52] U.S. Cl. .................................... 350/288; 126/438
[58] Field of Search ............... 350/288, 292, 295, 310, 350/320; 126/438, 439

[56] References Cited

U.S. PATENT DOCUMENTS

| | | | |
|---|---|---|---|
| 2,806,134 | 9/1957 | Tarcici | 350/292 |
| 3,406,404 | 10/1968 | Maier | 350/293 X |
| 3,574,447 | 4/1971 | Ruble | 350/295 X |
| 3,635,547 | 1/1972 | Rushing et al. | 350/288 |
| 3,781,095 | 12/1973 | Rushing et al. | 350/288 X |
| 3,843,238 | 10/1974 | Rushing et al. | 350/288 X |
| 3,973,834 | 8/1976 | Penn et al. | 350/310 |
| 4,035,064 | 7/1977 | Cowman, Jr. et al. | 350/293 |
| 4,134,387 | 1/1979 | Tornstrom | 350/295 X |

Primary Examiner—F. L. Evans
Attorney, Agent, or Firm—Edwin H. Crabtree

[57] ABSTRACT

A solar reflector having a flexible triangular reflective sheet or membrane for receiving and reflecting solar energy therefrom. The reflector is characterized by the triangular reflective sheet which is placed under tension thereby defining a smooth planar surface eliminating surface deflection which heretofore has reduced the efficiency of reflectors or heliostats used in combination for receiving and transmitting solar energy to an absorber tower.

7 Claims, 5 Drawing Figures

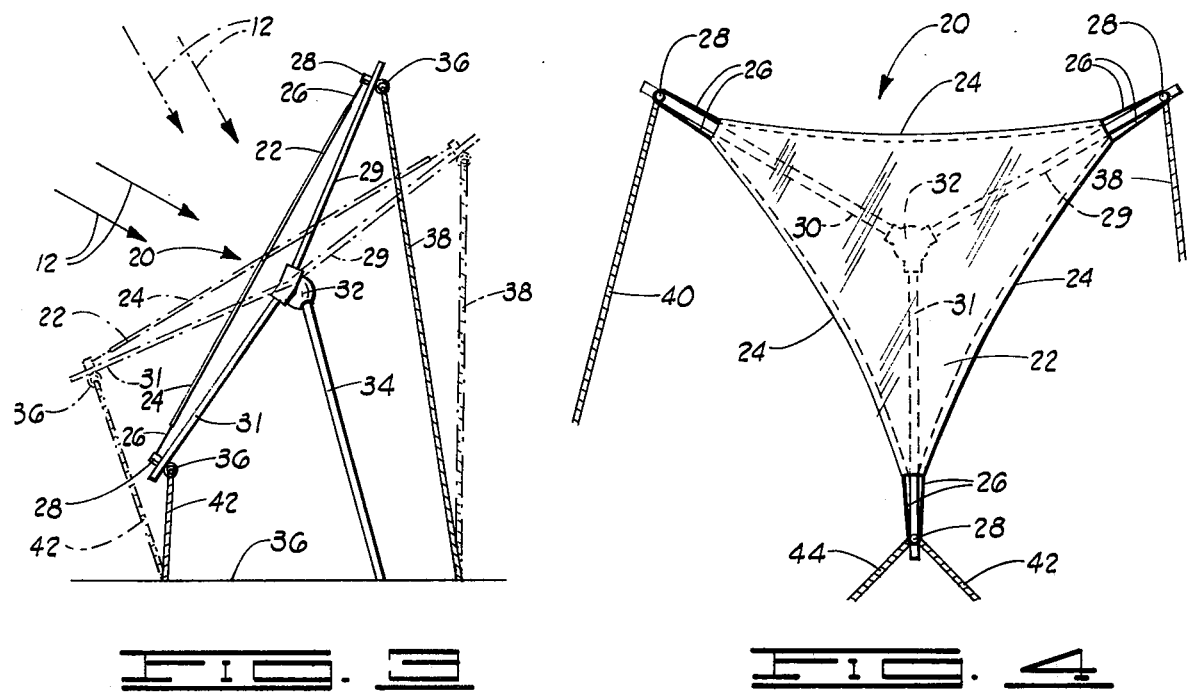
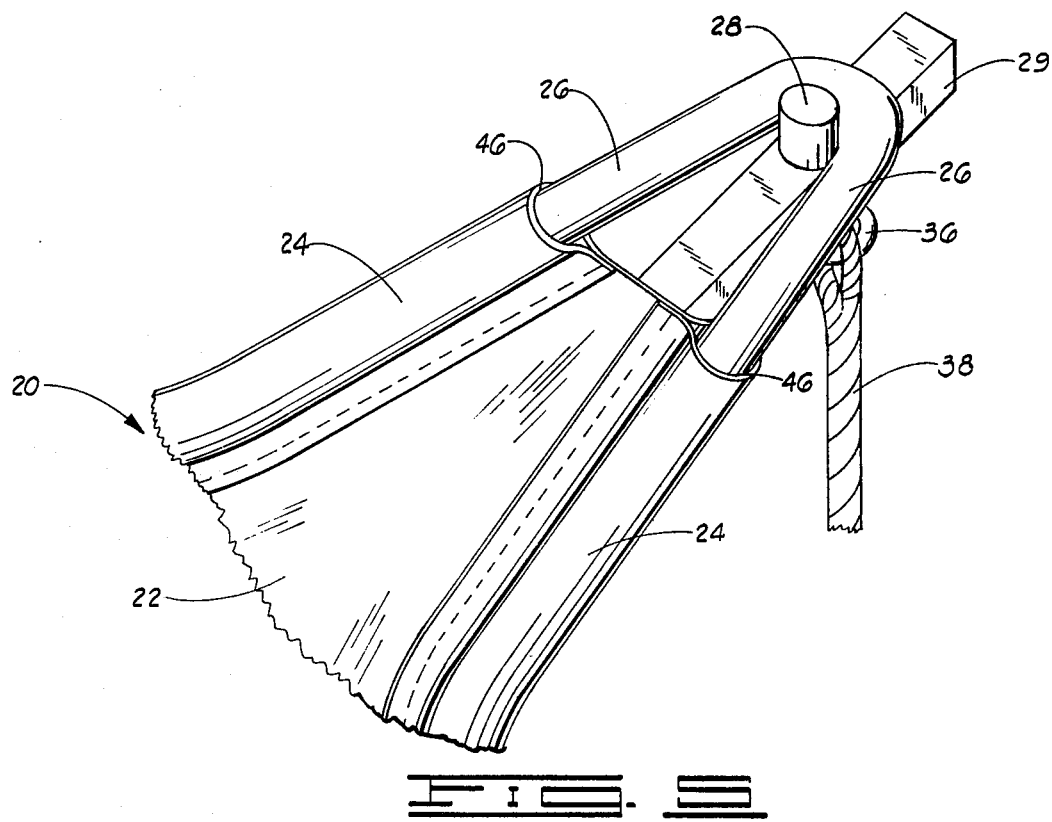

SOLAR REFLECTOR

BACKGROUND OF THE INVENTION

This invention relates to a solar reflector for receiving and reflecting solar energy and more specifically, but not by way of limitation, to a solar reflector having a reflective sheet made of a flexible triangular membrane which is held in tension by a cable so that the reflective sheet is continuously held in a smooth plane and surface deflection is thereby eliminated.

Heretofore typical receivers or heliostats used in combination for transmitting sunlight used in thermal processes have used a rectangular flat plate of highly polished metal or silvered glass mounted on a rigid frame. The frame has a system of supports and pivots along with a steering mechanism for rotating with the travel of the sun. The prior art heliostats of this type have the disadvantages in that the reflective surface must be of adequate thickness to prevent waves, dents and ripples in the surface. Also the frame must hold the reflective surfaces perfectly flat to eliminate the possibility of surface twist or other deflections due to wind loading. This type structure requires the supports, pivots and steering mechanism to be sufficiently strong to withstand high wind loads and loads imposed by the weight of the frame and reflective surface and, therefore, the material cost is significant with most of this cost being unrelated to the basic purpose of reflecting solar radiation.

Prior art reflectors for reflecting solar energy have been disclosed using membranes under tension. These reflectors are disclosed in U.S. Pat. No. 3,635,547, U.S. Pat. No. 3,843,238 and U.S. Pat. No. 3,781,095 to Rushing, et al. The use of mirrors with stretched reflective material is disclosed in U.S. Pat. No. 3,973,834 to Penn, et al. Also various types of reflector constructions are disclosed in U.S. Pat. No. 3,406,404 to Maier, U.S. Pat. No. 3,574,447 to Ruble, and U.S. Pat. No. 4,035,064 to Cowman, Jr., et al.

None of the above prior art patents disclose the unique structure of the subject solar reflector as described herein.

SUMMARY OF THE INVENTION

The subject invention provides an inexpensive reflector or heliostat configuration which overcomes the need of having expensive and carefully constructed reflector frame, supports, pivots and steering mechanism and provides a reflector requiring a minimum amount of materials for reflecting solar energy.

The solar reflector includes a flexible triangular reflective sheet providing a smooth surface which is free of waves, dents and ripples and minimizes deflection of the surface due to wind loading.

The support frame requirements are minimized by attaching the frame at only three points on the triangular reflective sheet. This eliminates the possibility of surface distortions due to frame deflection since the three attached points will always define a plane. The invention is simple in design, rugged in construction and may be easily rotated for adjusting to seasonal changes and following the sun's daily travel across the earth's surface.

The freedom of the configuration of the reflective sheet from surface distortion due to frame loading permits the use of the reflective sheet being placed under tension. The sheet further includes concave sides with the edge of the sides folded over and secured to the sheet forming a pocket for receiving a cable under tension therein. As the cable is tightened, tension is placed along the length of the sides of the sheet in a direction perpendicular to the edge of the sheet, thereby providing a uniform stress across the entire surface of the triangular reflective sheet.

The solar reflector for receiving and collecting solar energy therefrom includes a flexible triangular reflective sheet with concave sides. The edge of the sides of the sheet are folded over and secured to the sheet forming a pocket therein. A cable is received in the pocket and is placed in tension along the length of the sides of the sheet. The cable is attached at the three corners of the sheet to the ends of three radial arms. The arms are attached to a ball joint support on the top of a support column. A plurality of steering cables are preferably attached to the ends of the radial arms. The steering cables are lengthened and shortened so that the reflective sheet may be rotated as the sun travels from east to west and pivoted upwardly and downwardly as the sun changes elevation.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 is a side view of the solar reflector with the reflector pivoted to adjust for the elevation of the sun due to seasonal changes due to the earth's rotation.

FIG. 4 is a front view of the solar reflector.

FIG. 5 is an enlarged partial perspective view of one end of the reflective sheet and cable attached to the end of the radial arm.

DETAILED DESCRIPTION OF THE DRAWINGS

Figure 1:
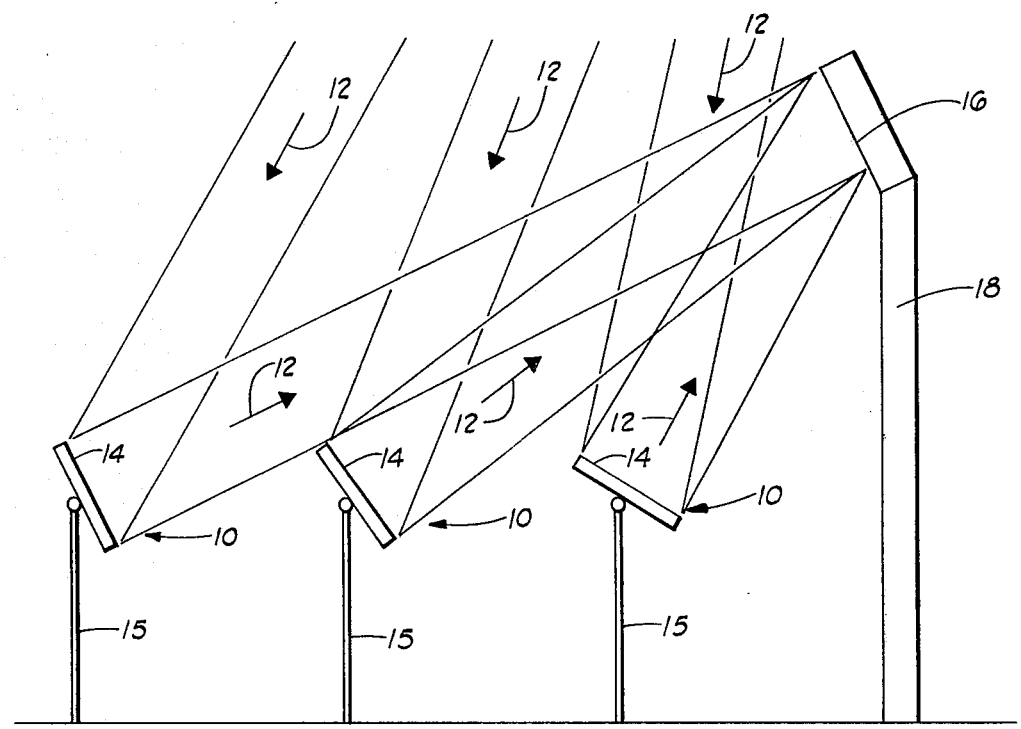
FIG. 1 is a side view of a typical installation of a plurality of reflectors used for concentrating solar energy toward a tower mounted absorber.

In FIG. 1 a side view of a typical installation of a plurality of solar reflectors are shown and designated by general reference numeral 10. These reflectors 10 may be the same as the subject invention as described herein or may be any standard type of reflectors or heliostats. The reflectors 10 are used for receiving solar energy indicated by arrows 12 and reflecting this energy off of a reflective surface 14 mounted on posts 15. The solar energy is reflected and concentrated on a receiver 16 mounted on top of a tower 18. The concentrated solar energy is absorbed by the receiver 16 and then conducted for use in various types of thermal energy processes. Again FIG. 1 is shown to give the reader an illustration of the utilization of these types of reflectors or heliostats and how they are used in concentrating solar energy.

Figure 2:
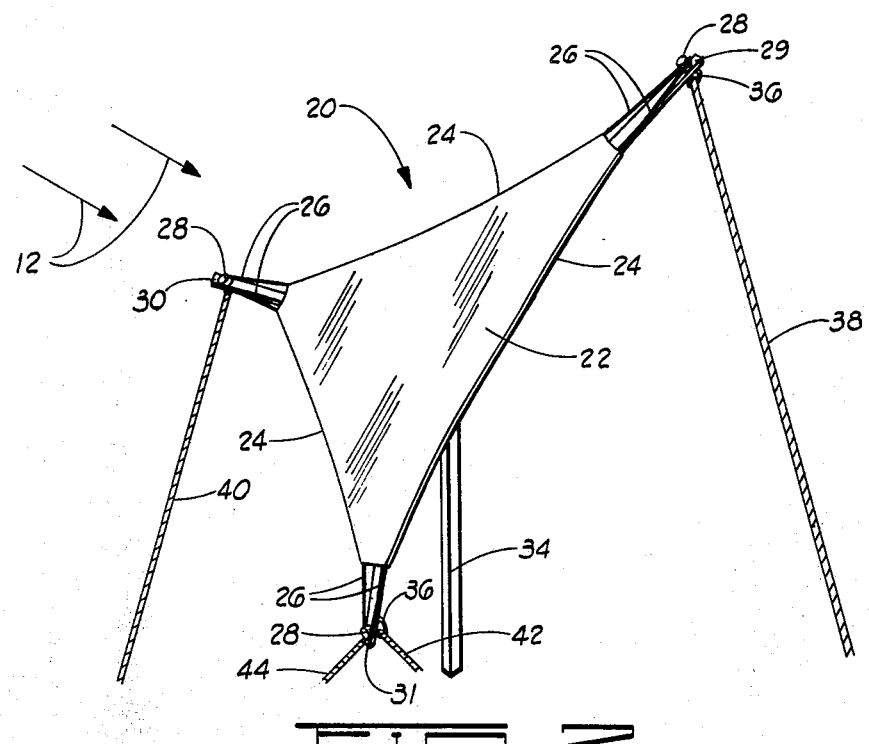
FIG. 2 is a perspective view of the solar reflector.

In FIG. 2 the novel structure of the subject solar reflector is illustrated and designated by general reference numeral 20. The solar reflector 20 includes a flexible triangular reflective sheet 22 having three sides 24 therearound. The sheet 22 may be a reflective membrane or any other material suitable for reflecting solar energy. The reflective sheet 22 is held in tension by a cable 26 which is received in a pocket formed along the sides 24 of the sheet 22. The ends of the cable 26 are received around a keeper 28. The keeper 28 is attached to the ends of three radial arms 29, 30 and 31. The opposite ends of the radial arms 29, 30 and 31 are attached to a ball joint 32 mounted on top of an upstanding support column 34 which is mounted on top of a ground surface 36 or the like. The ball joint 32 can be seen in FIGS. 3 and 4.

The three radial arms 29, 30 and 31 are attached to steering cables which are used for pivoting the reflective sheet 22, cable 26, radial arms 29, 30 and 31, and the ball joint 32 on the support column 34 so that the reflective sheet 22 can follow the travel of the sun from east to west and the reflective sheet 22 can be corrected due to the change in the sun's elevation in relation to the earth's rotation during seasonal changes. The ends of the steering cables are attached to eyelets 36 which are mounted on the ends of the radial arms 29, 30 and 31. A steering cable 38 is attached to the end of the radial arm 29. A second steering cable 40 is attached to the end of the radial arm 30. A third steering cable 42 and a fourth steering cable 44 are both attached to the end of the radial arm 31. The cables 38, 40, 42 and 44 are adjustable in length and by shortening cable 40 and lengthening cable 38 with the cables 42 and 44 held in a fixed position, the reflective sheet 22 can be rotated from east to west to follow the travel of the sun and provide a flat planar surface which is at an appropriate angle to the sun rays as indicated by arrows 12. While the means of lengthening and shortening the cables 38, 40, 42 and 44 is not shown in the drawings, any type of motor driven winch or the like could be used attached to the arms 29, 30 and 31 with the eyelets 36 or pulleys, etc. being used to support the cable at the end of the arm. Likewise, motor driven winches could be mounted on the ground surface and attached to the cables 38, 40, 42 and 44 for lengthening and shortening the cables.

In FIG. 3 a side view of the solar reflector 20 is illustrated. In this view the reflector 20 is shown illustrating how it is pivoted on the ball joint 32 so that the planar surface of the reflective sheet 22 remains at an appropriate angle to the sun rays 12 as the elevation of the sun changes. In this illustration, the reflector 20 is shown in dotted lines with cables 38 and cable 40 shortened and cables 42 and cable 44 lengthened so that the surface of the reflective sheet 22 faces the sun having a higher elevation from the horizon during the summer season. Cable 40 is hidden behind cable 38 and cable 44 is hidden behind cable 42. As the elevation of the sun lowers in the fall and winter season, the cables 42 and 44 are shortened and in turn cables 38 and 40 are lengthened so that the reflective sheet 22 faces the sun having a lower elevation from the earth's surface.

In FIG. 4 a top view of the solar reflector 20 is illustrated. In this view the radial arms 29, 30 and 31 are shown in dotted lines behind the reflective sheet 22 and connected to the ball joint 32. In this view the sides 24 of the reflective sheet 22 can be seen having a concave shape. The concave shape of the sides 24 is important in that the cable 26 extends along the length of the sides 24 and is received in a pocket along the length of the sides 24. As the cable 26 is tightened, the entire surface of the triangular sheet 22 is stretched and placed under tension, thereby providing a uniform load across the entire surface of the sheet 22 thereby eliminating any waviness, dents or ripples which would minimize the efficiency of the reflective surface of the sheet 22.

In FIG. 5 a partial perspective view of a portion of one end of the sheet 22 attached to the end of radial arm 29 by cable 26 is shown. In this view the edges of the sheet 22 can be seen folded over and attached to the sheet 22 forming a pocket 46 for receiving the cable 26 therein. While the edges of the sheet 22 are used to form the pocket 46, it can be appreciated that various others means may be used for receiving the cable 26 along the sides of the sheet 22 and applying tension thereon. The end of the cable 26 can be seen looped around the keeper 28 and held in tension thereon. The keeper 28, while not shown in the drawings, can be adjustable along the length of the radial are 29 for increasing tension on the cable 26. Also seen in this view is a portion of the cable 38 attached to the eyelet 36. While not shown in the drawings the steering cables 38, 40, 42 and 44 may be attached to the ground surface 36, a base, or the like and having means for adjusting the length of the cables so that the sheet 22 is maintained at an appropriate angle to the direction of the sun.

Changes may be made in the construction and arrangement of the parts or elements of the embodiments as described herein without departing from the spirit or scope of the invention defined in the following claims.

What is claimed is:

1. A solar reflector for receiving and reflecting solar energy therefrom, the reflector comprising:
   a flexible triangular reflective sheet;
   tension means connected to the three corners of the reflective sheet for placing the sheet under tension and forming a smooth planar surface; and
   support means attached to the tension means for supporting the tension means and reflective sheet thereon.

2. The reflector as described in claim 1 further including steering means attached to the support means for rotating the reflective sheet as the sun travels from east to west and pivoting the reflective sheet upwardly and downwardly for changes in the sun's elevation.

3. The reflector as described in claim 1 wherein the support means is an upstanding support column having a ball joint mounted on the top thereof and connected to three radial support arms extending outwardly therefrom, the ends of the support arms attached to the tension means.

4. The reflector as described in claim 3 wherein the tension means is a tension cable.

5. The reflector as described in claim 4 wherein the edges of the three sides of the reflective sheet are concave in shape, the cable secured to the sides of the reflector sheet and extending along the length of the sides of the reflective sheet and secured to the ends of the radial support arms.

6. A solar reflector for receiving and reflecting solar energy therefrom, the reflector comprising:
   a flexible triangular reflective sheet, the three sides of the sheet concave in shape;
   a tension cable secured to and disposed along the length of the concaved shaped sides of the triangular sheet, the cable held in tension for placing the sheet under tension and forming a smooth planar surface;
   a support column extending upwardly from the ground surface or the like and having a ball joint mounted on the top thereof; and
   three radial support arms connected at one end to the ball joint, the opposite ends of the support arms attached to the cable at the three corners of the triangular sheet, the support arms supporting the cable and the reflective sheet thereon.

7. The reflector as described in claim 6 further including a plurality of steering cables attached to the radial support arms, the steering cables being adjustable in length so that when the cables are lengthened and shortened the reflective sheet can be rotated as the sun travels from east to west and the reflective sheet can be pivoted upwardly and downwardly for changes in the sun's elevation.

* * * * *